(No Model.) 7 Sheets—Sheet 1.

W. H. BAYNARD, Jr.
MACHINE FOR DESCRIBING SHOE PATTERNS FROM LASTS.

No. 523,193. Patented July 17, 1894.

—WITNESSES— —INVENTOR—

(No Model.) 7 Sheets—Sheet 3.
W. H. BAYNARD, Jr.
MACHINE FOR DESCRIBING SHOE PATTERNS FROM LASTS.
No. 523,193. Patented July 17, 1894.

-WITNESSES- -INVENTOR- (No Model.)

W. H. BAYNARD, Jr.

MACHINE FOR DESCRIBING SHOE PATTERNS FROM LASTS.

No. 523,193. Patented July 17, 1894.

(No Model.) 7 Sheets—Sheet 5.

W. H. BAYNARD, Jr.
MACHINE FOR DESCRIBING SHOE PATTERNS FROM LASTS.

No. 523,193. Patented July 17, 1894.

-WITNESSES-
Dan'l Fisher

-INVENTOR-
William H. Baynard, Jr.
by G. H. & W. T. Howard,
atty.

(No Model.) 7 Sheets—Sheet 6.

W. H. BAYNARD, Jr.
MACHINE FOR DESCRIBING SHOE PATTERNS FROM LASTS.

No. 523,193. Patented July 17, 1894.

-WITNESSES-

-INVENTOR- (No Model.) 7 Sheets—Sheet 7.
W. H. BAYNARD, Jr.
MACHINE FOR DESCRIBING SHOE PATTERNS FROM LASTS.
No. 523,193. Patented July 17, 1894.

WITNESSES

INVENTOR
William H. Baynard, Jr.

UNITED STATES PATENT OFFICE.

WILLIAM H. BAYNARD, JR., OF BALTIMORE, MARYLAND, ASSIGNOR TO FRANK F. STANLEY, OF BOSTON, MASSACHUSETTS.

MACHINE FOR DESCRIBING SHOE-PATTERNS FROM LASTS.

SPECIFICATION forming part of Letters Patent No. 523,193, dated July 17, 1894.

Application filed March 6, 1893. Renewed December 21, 1893. Serial No. 494,356. (No model.)

*To all whom it may concern:*

Be it known that I, WILLIAM H. BAYNARD, Jr., of the city of Baltimore and State of Maryland, have invented certain Improvements in Machines for Describing Shoe-Patterns from Lasts, of which the following is a specification.

In the description of the said invention which follows, reference is made to the accompanying drawings forming a part hereof, in which—

Figure 1:
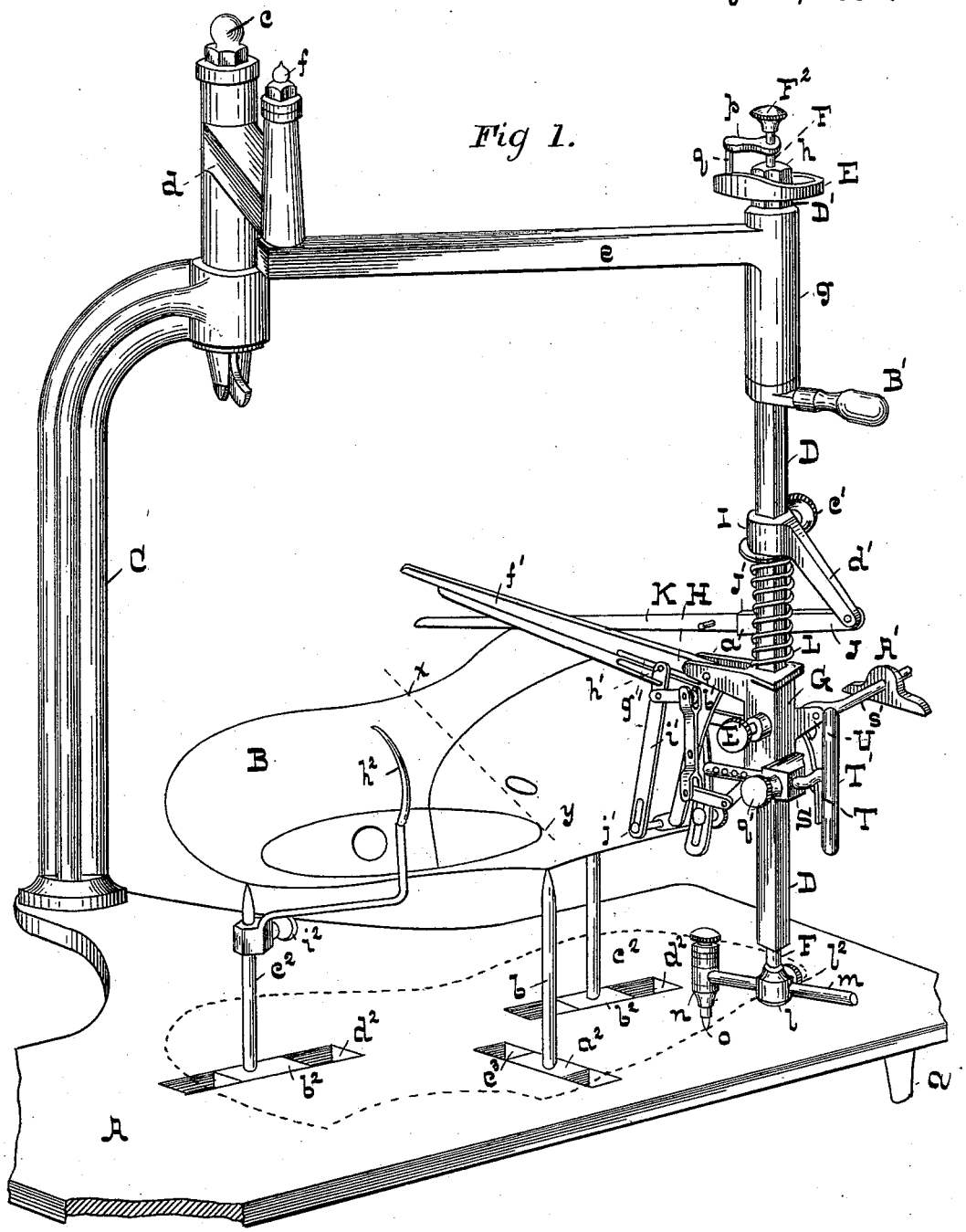
Figure 2:
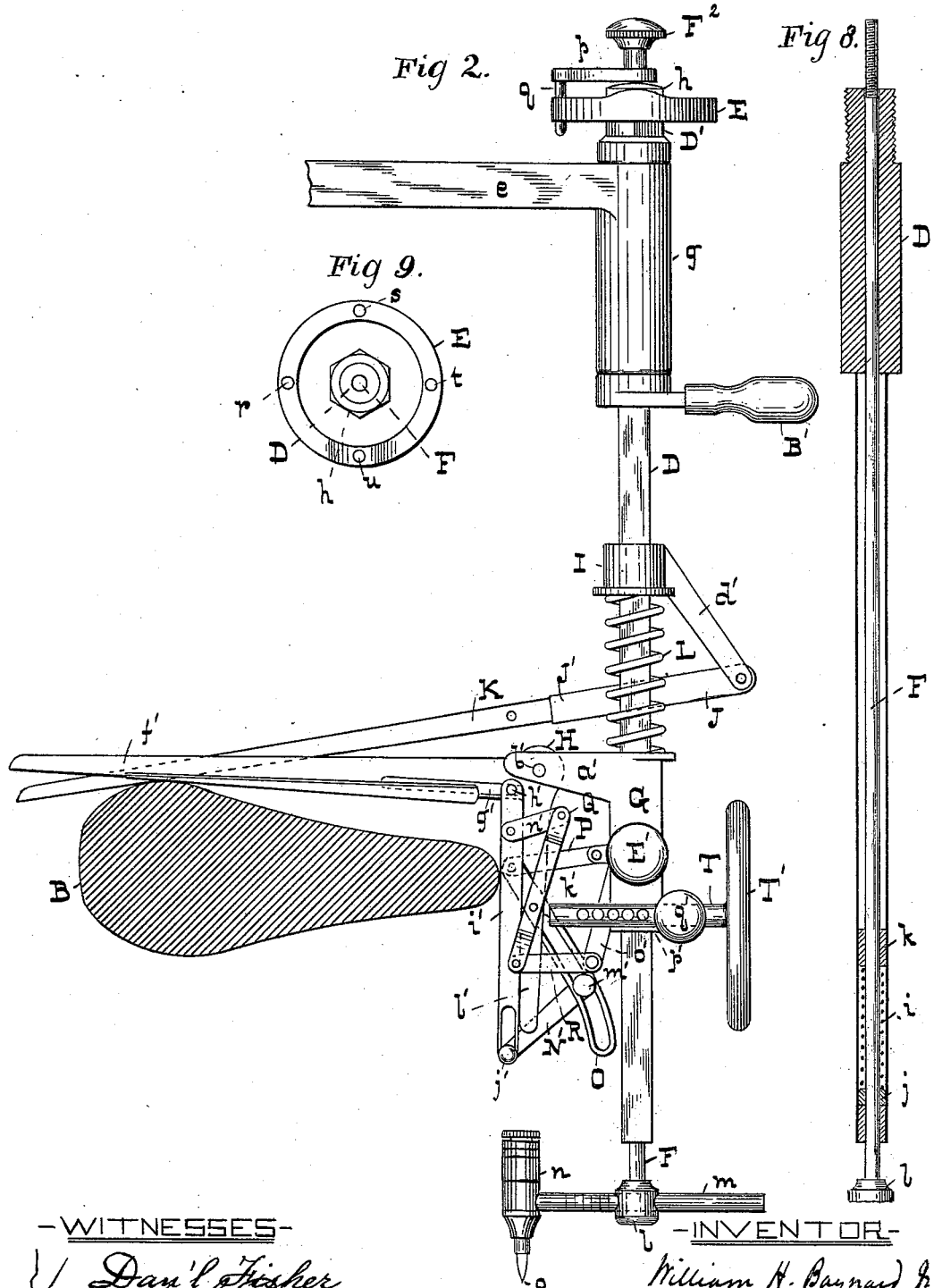
Figure 3:
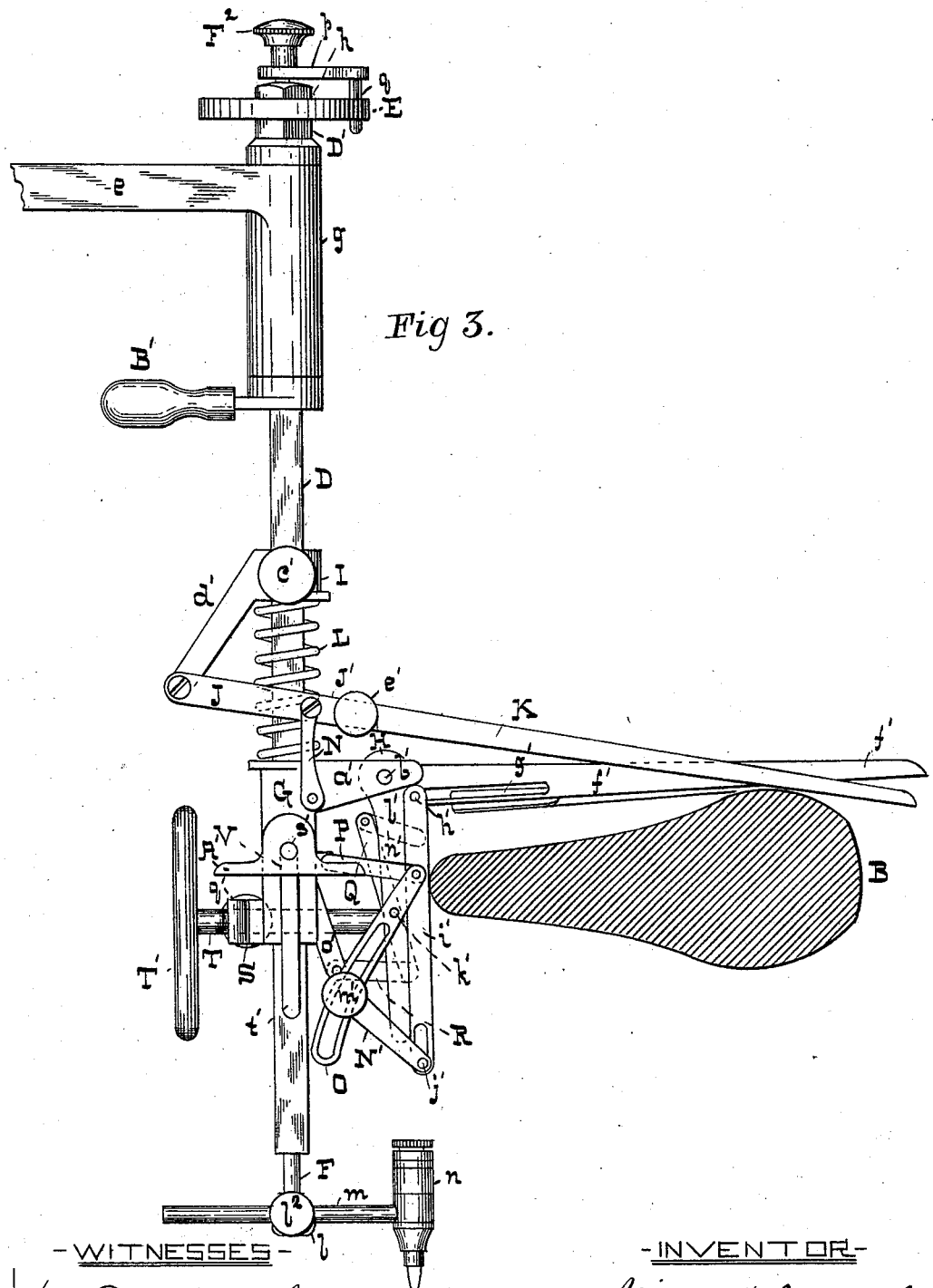
Figure 4:
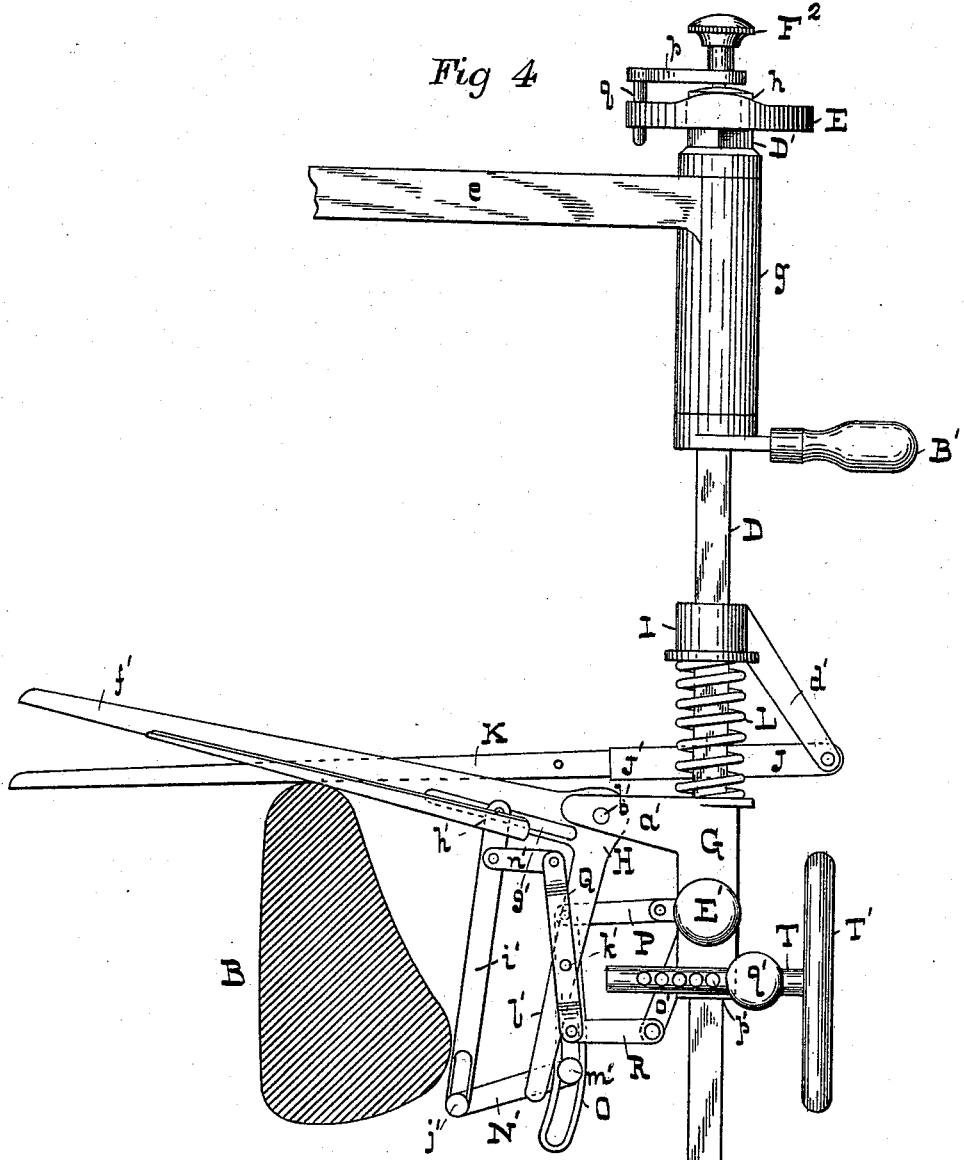
Figure 5:
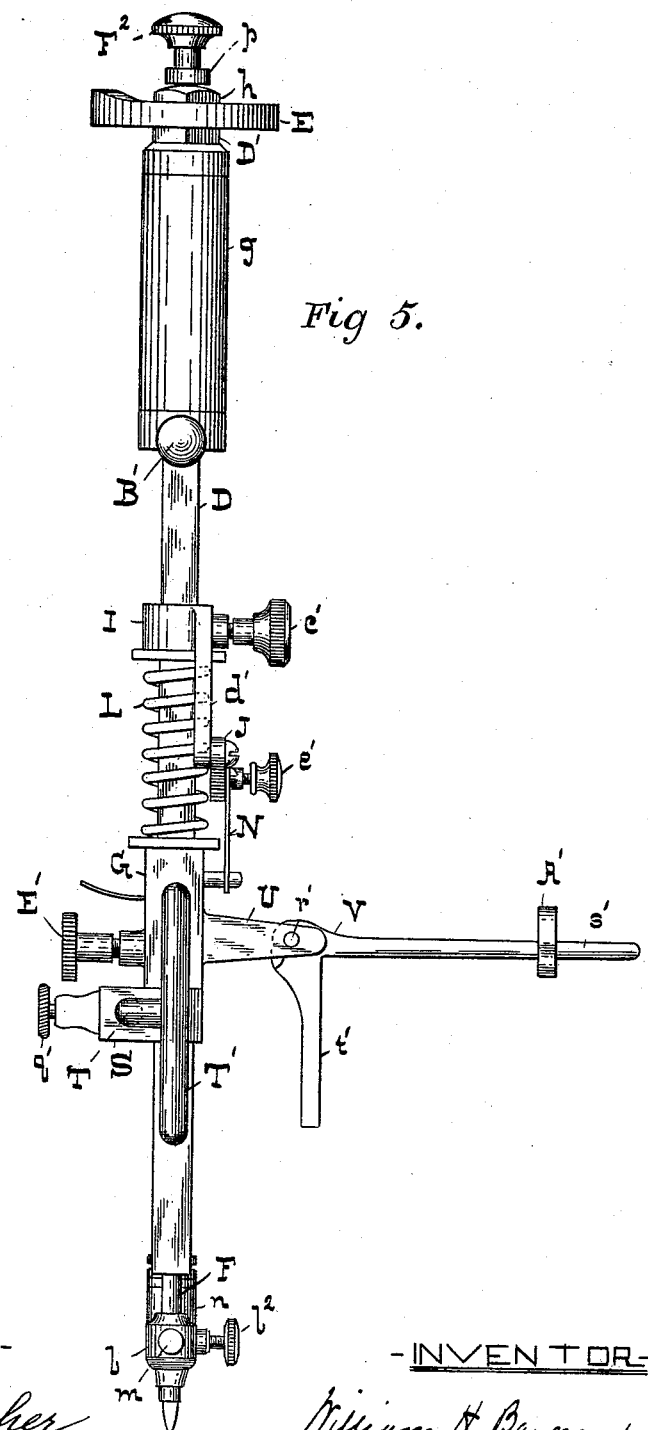
Figure 6:
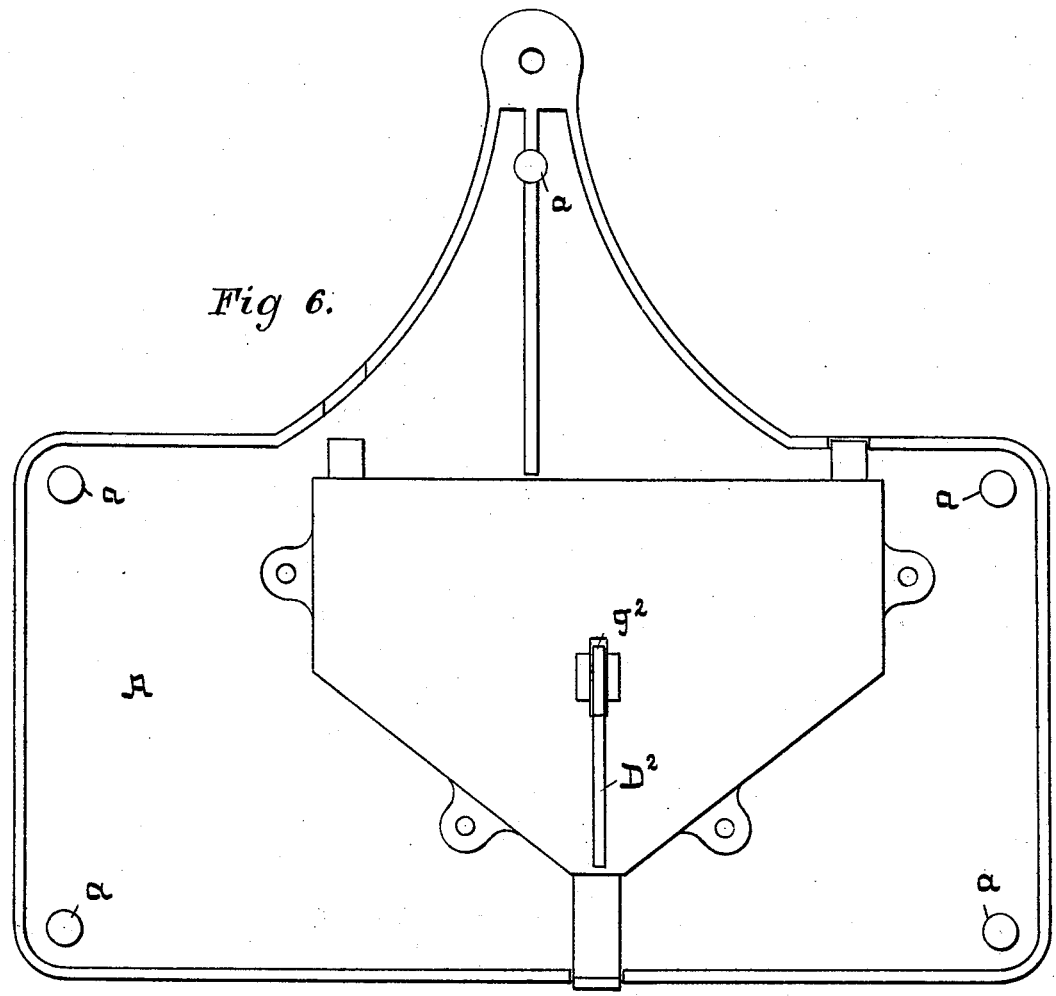
Figure 7:
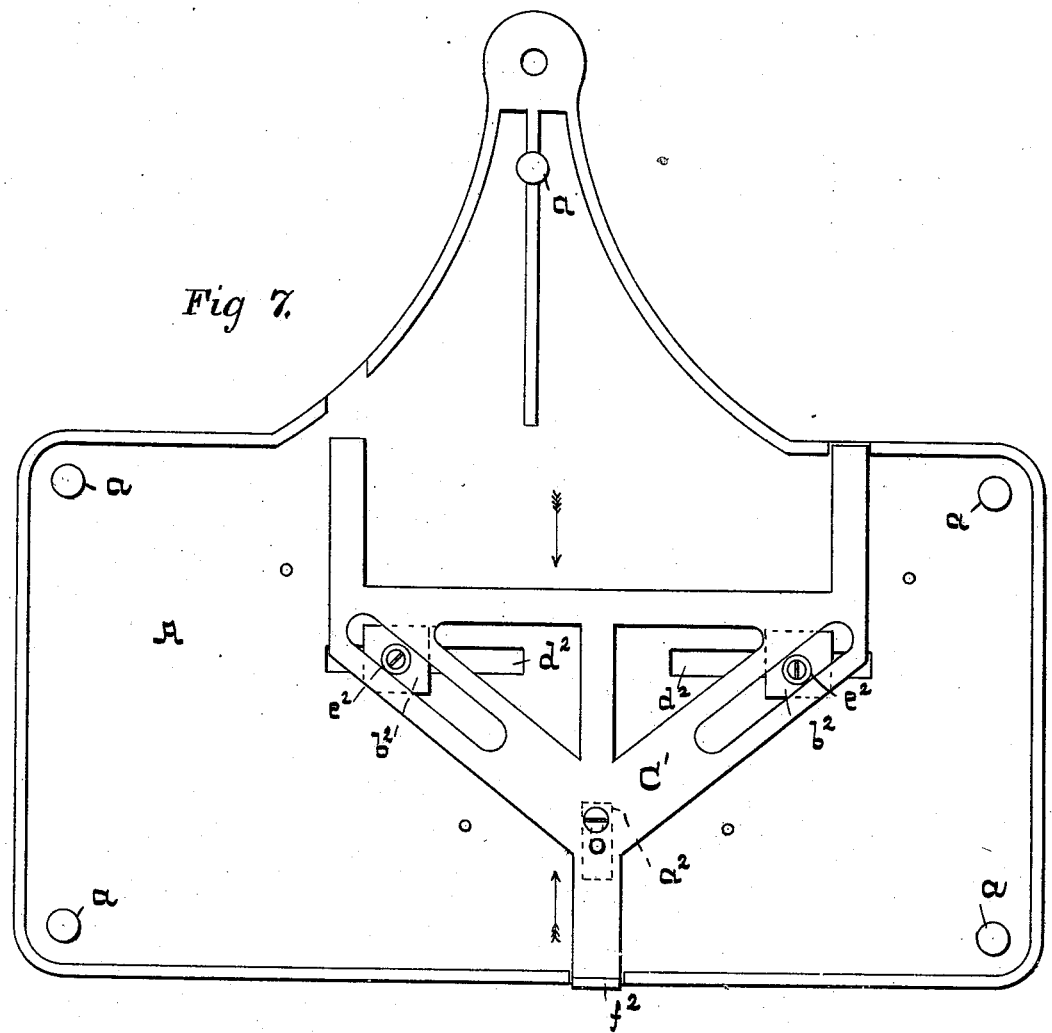

Figure 1 is a perspective view of the machine with certain parts of the base thereof broken away. Fig. 2 is a front view of certain parts of the machine illustrating the first step in the operation of describing a pattern. Fig. 3 is a reverse or rear view of Fig. 2. Fig. 4 is a view similar to Fig. 2, except that the moving parts of the machine have different relative positions, or occupy the relative positions indicated in the perspective view, Fig. 1. Fig. 5 is a view of the same parts as are shown in Figs. 2, 3 and 4, but they are seen from a point ninety degrees removed from that used in the said figures. Fig. 6 is an under side view of the machine, and Fig. 7 a similar view with a certain covering plate removed. Figs. 8 and 9 are details of the invention.

Referring to the drawings A is the base plate of the machine supported by the legs $a$.

B is the shoe last to be operated upon, and it is sustained at a short distance above the base plate A, by means of three pointed pins $b$ and $c^2$ which pass through the base plate and are secured to adjusting devices hereinafter described. In order that the last may be held in a truly horizontal position, the pins $b$ and $c^2$ must be of different lengths as shown in Fig. 1.

C is a standard projecting upward from the rear side of the base plate A. The upper part of this standard is curved inward or toward the center of the plate A. The upper overhanging end of this standard is bored out and fitted with a stationary stud $c$, and to this stud is attached the first of a series of swinging arms $d$. The second swinging arm $e$, is pivoted to the first, a suitable stud $f$ being used in effecting the connection. At the outer end of this second swinging arm $e$, is a socket $g$, in which is adapted to turn circumferentially the bar D. It will be seen in Figs. 8 and 9 that the portion of the bar D within the socket $g$ is round, while the portion below the socket is square or of some other polygonal shape of cross section. The bar D is held in its socket by a nut D'.

E is a plate shown in the drawings as circular secured to the upper end of the bar D. The means for securing the plate E to the bar D consists of a nut $h$ screwed thereon and a feather in the plate to prevent its turning independently of the bar D. The object of the plate E will be hereinafter described.

F is a rod extending entirely through the bar D and adapted to turn therein. The bearings for the rod are shown in Fig. 8 and it will seen that there is a spring $i$ confined endwise between a collar $j$ on the rod and the upper bearing $k$ which serves to keep the said rod yieldingly at its lowest position. The lower end of the bar F has a block $l$ through which is passed transversely the pencil bar $m$ carrying the pencil socket $n$. The pencil point is denoted by $o$. The bar $m$ when adjusted in position is held firmly by the set screw 12. At the upper end of the bar F is a small arm $p$ carrying a downwardly extending pin $q$ adapted to enter any one of the four holes $r$, $s$, $t$ and $u$ in the plate E, see Fig. 9, which is a top view of the plate E, for purposes hereinafter described.

G is a block adapted to slide vertically on the bar D, having a bracket $a'$, in which is pivoted the bent lever H at $b'$.

I is a collar fastened by a set screw $c'$ to the bar D. This collar has a bracket $d'$ to the end of which is pivoted a lever J having at one end a socket J' adapted to receive an arm K. A set screw $e'$ serves to prevent the withdrawal of the arm K from the socket J'.

L is a spiral spring coiled about the bar D and confined end-wise between the block G and the collar I. A link N Fig. 3 connects the arm J with the block G.

From the construction described it will be seen that if the outer end of the arm K is lifted, the block G will be raised on the rod D and the spiral spring L compressed.

The horizontal arm $f'$ of the bent lever H is flanged to increase its width and has a slot $g'$ in which slides a pin $h'$ in the branched end of a bar $i'$. The lower end of this bar $i'$ is slotted and connected by an arm $N'$ and a pin $j'$ to a vibratory slotted curved lever O, fulcrumed at $k'$ to the downwardly extending arm $l'$ of the bent lever H. The means of connection between the arm $N'$ and the slotted curved lever O, consists principally of a screw and a thumb nut $m'$ whereby the position of the arm $N'$ with reference to the slotted lever O may be adjusted. The upper end of the slotted curved lever O is pivoted to a link P, which in turn is pivoted to the block G. Near the upper end of the bar $i'$ is pivoted a link $n'$ which is jointed to the vibratory end of a lever Q, having its fulcrum at $k'$. The lower end of the lever Q is jointed to a link R, the other end of which is pivoted to a lug $o'$ projecting from the block G.

S is a lug on the block G, through which is adapted to slide a bar T, having a series of holes $p'$ into any one of which the end of a set screw $q'$ may be screwed to hold the said bar. The outer end of the bar has a cross head $T'$ which is thrown back so as to be in alignment with the center of the bar D.

U is another lug Fig. 5 projecting from the block G and extending at a right angle with the bracket $a'$.

V Fig. 5 is a bent lever fulcrumed at $r'$ in the lug U. $A'$ is a foot on the arm $s'$ of the bent lever V and $t'$ is the other arm of the said lever. The set screw $E'$ is used to hold the block G stationary on the bar D, when desired.

$B'$ is a handle projecting from the bar D and extending in an opposite direction to that of the lever K, whereby the bar D and its connections may be moved in the operation of the machine hereinafter described.

The pins $b$ and $c^2$ are screwed into blocks, $a^2$ and $b^2$ adapted to slide in slots $c^3$ and $d^2$ in the base plate A. The block $a^2$ is fastened to a triangular plate $C'$ and the other blocks $b^2$ have rollers, $e^2$ which rest in angular slots in the triangular plate $C'$. This triangular plate is moved in the direction indicated by the arrows in Fig. 7, by means of a lug $f^2$, and in such movement the pins $b$ and $c^2$ are made to approach each other, or to be distended. The object of this adjustability of the pins $b$ and $c^2$ is to admit of the support of shoe lasts of any size. When the adjustment is made, all further motion of the pins in any direction, is prevented by means of a hand lever $D^2$, Fig. 6 having a cam $g^2$ on its under side adapted to press on the triangular plate $C'$ as will be readily understood.

To prevent the seated lasts from being lifted, one of the pins $c^2$ has an adjustable hook $h^2$, the point of which may be made to engage with the top of the last. The adjustment is made by means of a set screw $i^2$.

Supposing that a last is seated on the pins $b$ and $c^2$ and held down by the hook $h^2$ as shown in Fig. 1, and it is desired to describe on a paper which has been previously placed over the pins and smoothed down to the base plate, a pattern from which one-half of the upper may be cut, the operation is as follows: The collar I which carries all the levers and other mechanism attached to the block G is adjusted in height on the bar D, until the arm H when in a practically horizontal position will touch the shoe last at the point $x$ on the dotted line in Fig. 1, and the bar $i'$ touch the said last at the point $y$ on the same dotted line. The rod F which has been supported in an elevated position by the pin $q$ resting in the shallow hole $u$ which is in the elevated part of the rim of the plate E, is now lifted by the knob $F^2$ and the pin $q$ allowed to enter the hole $r$ which has the effect of bringing the pencil end of the bar $m$ in alignment with the arm $f'$ of the lever H, and at the same time permit the point $o$ of the pencil to touch the paper on the plate A. This gives the starting point of the first line to be described, or the beginning of the first pattern-describing operation. Fig. 2 shows the relative positions of the last and the various parts of the invention at this time. The operator now grasps the handle $B'$ and pushes the movable mechanism toward the toe of the shoe last, keeping the arm $f'$ of the lever H at a right angle with the longitudinal line of the shoe last. Now supposing for a moment that instead of a shoe last a block of uniform size and shape throughout its length was on the pins projecting from the base plate, the line described by the pencil in passing from one end of the block to the other would be straight and parallel with the block. But in a shoe last, the shape being irregular, a curved line is drawn. It will be seen that if the bar $i'$ is held motionless, and the arm $f'$ raised, the pencil point $o$ will be forced out or from the last. But if the said bar is not held, the raising of the arm $f'$ has no effect on the position of the pencil point $o$.

In following the contour of the shoe last, the raising of the arm $f'$ as it approaches the ball of the shoe last, has a tendency to draw in the bar $i'$, but as that bar cannot move in, past the surface of the shoe last with which it is in contact, the whole movable mechanism is moved out. In other words the curved line which would be described by the pencil as the bar follows the shape of the instep and ball, if the arm $f'$ were not employed, is modified or distorted when that device is used, and the line produced is a compromised one, resulting from the modifying influence which the arm $f'$ has on the bar $i'$ or vice versa. This part of the operation is continued until the bar $i'$ passes to the toe of the last.

To prepare the machine for the second part of the operation, which consists in describing the edge of the pattern which is to be turned in or under the sole, the bar T is drawn outward from its normal position shown in the drawings, a distance equal to the width of the turned in portion and secured by the set screw $q'$. The knob $F^2$ is now raised to admit of the pin $q$ being inserted in the hole $t$, in the rim of the plate E. This brings the pencil bar under the bar T. The movable portion of the machine is now moved, so as to bring the cross head of the bar T in contact with the bottom of the shoe last. The head of the bar T is now moved along the bottom of the shoe last from the toe to the heel, or vice versa, the bar T being kept at a right angle with the longitudinal line of the last, and the turned in edge of the pattern is thus described.

To prepare the machine to describe the heel line, the bent lever V is brought in contact with the heel part of the last, and carried along it in either direction, the shoe A' on the arm $s'$ bearing on the surface of the shoe last and the arm $t'$ of the lever bearing against the extreme end of the heel. This concludes the pattern-describing operation.

By reference to Figs. 1, 2, 3 and 4, it will be seen that the arm K rests on the shoe last in advance of the arm $f'$ of the lever H. This arm K operates directly through the medium of the link N to raise and lower the block G, and when used in connection with the arm $f'$ it serves to modify the effect of the position of the arm $f'$ and the position of the pencil point. In other words the elevation of the arm K serves to draw in the pencil point, and its depression serves to throw the said point out, or farther from the center line of the last, provided the arm $f'$ is held stationary.

I claim as my invention—

1. In a machine for describing patterns from shoe lasts, a base having upwardly extending and laterally adjustable pointed pins, of different heights adapted to enter and support the shoe last in an elevated position combined with an adjustable hook for holding the shoe last on the pins, substantially as specified.

2. In a machine for describing shoe patterns from lasts, the combination of a base, a support for the last, a pencil holder or marker connected by hinged arms to a fixed point, and a system of levers and arms connected with a pencil holder or marker, adapted to be carried around and in contact with the last, whereby the shape of the last as described on the base or on a sheet of paper laid on the base is distorted or modified by the relative width, thickness and other details in conformation of the last, substantially as specified.

3. In a machine for describing shoe patterns from lasts the combination of a base, a support for the last, a vertical bar connected by hinged arms to a fixed point or support, a pencil holder or marker carried by the said bar and susceptible to vertical movement and also of rotation, a block adapted to slide on the said bar and held yieldingly in its lowest position, a system of levers and arms adapted to rest against the shoe last and by their relative positions cause the said pencil holder or marker to assume various distances from the surface or edge of the last, and thereby, as the said pencil holder or marker is carried around the last describe a line, which is a modification of the shape of the last, substantially as specified.

4. In a machine for describing shoe patterns from lasts, a support for the last which consists of pointed pins of different heights all of which are situated within the boundary line of the last, whereby a pencil or a marker and its connections, may be passed around and in contact with the last without striking the pins, so as to describe its shape or any modification of its shape, substantially as specified.

WILLIAM H. BAYNARD, JR.

Witnesses:
WM. T. HOWARD,
DANL. FISHER.